US012784652B2

(12) United States Patent
An

(10) Patent No.: US 12,784,652 B2
(45) Date of Patent: Nov. 3, 2026

(54) MICRO-LED PIXEL CIRCUIT AND DISPLAY DEVICE INCLUDING THE SAME

(71) Applicant: LG Display Co., Ltd., Seoul (KR)

(72) Inventor: Sungbae An, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/532,231

(22) Filed: Dec. 7, 2023

(65) Prior Publication Data

US 2024/0203325 A1 Jun. 20, 2024

(30) Foreign Application Priority Data

Dec. 15, 2022 (KR) ........................ 10-2022-0175426

(51) Int. Cl.

*G09G 3/20* (2006.01)
*G09G 3/32* (2016.01)
*G09G 3/3225* (2016.01)
*G09G 3/3233* (2016.01)

(52) U.S. Cl.

CPC ............. *G09G 3/32* (2013.01); *G09G 3/2007* (2013.01); *G09G 3/2014* (2013.01); *G09G 3/3225* (2013.01); *G09G 3/3233* (2013.01); *G09G 2300/0866* (2013.01); *G09G 2310/0251* (2013.01); *G09G 2310/027* (2013.01); *G09G 2310/0291* (2013.01);

(Continued)

(58) Field of Classification Search

CPC ......... G09G 3/3233; G09G 2300/0861; G09G 2310/08; G09G 2320/0233; G09G 3/3266; G09G 2320/0626; G09G 2320/064; G09G 3/3208; G09G 3/3225; G09G 3/3258; G09G 3/2014; G09G 3/2007; G09G 3/2011; G09G 2320/0271; G09G 2310/0251; G09G 2310/027; G09G 2310/029; G09G 3/32; G09G 3/2081

See application file for complete search history.

(56) References Cited

U.S. PATENT DOCUMENTS

| | | | | |
|---|---|---|---|---|
| 11,862,069 | B2 * | 1/2024 | David | G09G 3/32 |
| 12,148,356 | B2 * | 11/2024 | Sun | G09G 3/32 |

(Continued)

FOREIGN PATENT DOCUMENTS

| | | | |
|---|---|---|---|
| CN | 113808532 | A | 12/2021 |
| JP | 2020-148964 | A | 9/2020 |

(Continued)

*Primary Examiner* — Dismery Mercedes

(74) *Attorney, Agent, or Firm* — Fish & Richardson P.C.

(57) ABSTRACT

A micro-LED pixel circuit includes a driving transistor configured to generate a current path; an emission transistor configured to be turned on in response to an emission signal to generate the current path with the driving transistor; a micro-LED configured to emit light based on a magnitude of a current flowing in the current path; and a precharge transistor configured to bias an anode electrode of the micro-LED with a precharge voltage in response to a precharge signal, wherein the precharge signal is enabled before the emission signal is enabled, thereby biasing an anode electrode of a micro-LED with a precharge voltage before emission in a PWM operation of the micro-LED, and improving a response speed of the micro-LED and minimizing luminance decrease at the low gray-scale.

22 Claims, 7 Drawing Sheets

(52) U.S. Cl.
CPC ............... *G09G 2320/0233* (2013.01); *G09G 2320/0271* (2013.01); *G09G 2320/064* (2013.01)

(56) References Cited

U.S. PATENT DOCUMENTS

| | | | | |
|---|---|---|---|---|
| 2011/0102410 | A1* | 5/2011 | Cho | G09G 3/3291 345/212 |
| 2011/0227815 | A1* | 9/2011 | Allen | G09G 3/3216 345/82 |
| 2013/0127924 | A1* | 5/2013 | Lee | G09G 3/2025 345/82 |
| 2013/0169619 | A1* | 7/2013 | Jeong | G09G 5/001 345/212 |
| 2014/0118328 | A1* | 5/2014 | Guo | G09G 3/3233 345/212 |
| 2014/0125714 | A1* | 5/2014 | Pyo | G09G 3/3233 345/691 |
| 2018/0068602 | A1* | 3/2018 | Xiang | G09G 3/3208 |
| 2018/0158398 | A1* | 6/2018 | Xiang | G09G 3/22 |
| 2019/0114971 | A1* | 4/2019 | Choi | G09G 3/3266 |
| 2019/0371250 | A1* | 12/2019 | Baek | G09G 3/3291 |
| 2021/0407385 | A1 | 12/2021 | Ikeda et al. | |
| 2022/0068224 | A1* | 3/2022 | Park | G09G 3/3233 |
| 2022/0208129 | A1 | 6/2022 | Yoo et al. | |
| 2022/0310000 | A1* | 9/2022 | David | G09G 3/32 |
| 2022/0327992 | A1* | 10/2022 | Chalmers | G09G 3/2074 |
| 2022/0351705 | A1* | 11/2022 | Ye | G09G 5/10 |
| 2023/0058388 | A1* | 2/2023 | Zhu | G09G 3/2074 |
| 2023/0206813 | A1* | 6/2023 | Kang | G09G 3/2007 318/685 |
| 2023/0335056 | A1* | 10/2023 | Cho | G09G 3/3266 |
| 2024/0021152 | A1* | 1/2024 | Wang | G09G 3/3225 |
| 2024/0127737 | A1* | 4/2024 | Sun | G09G 3/3208 |

FOREIGN PATENT DOCUMENTS

| | | | |
|---|---|---|---|
| KR | 10-2011-0047359 | A | 5/2011 |
| KR | 10-2013-0079950 | A | 7/2013 |
| KR | 10-2016-0027583 | A | 3/2016 |
| KR | 10-2022-0096912 | A | 7/2022 |
| WO | 2022/100416 | A1 | 5/2022 |

* cited by examiner

MICRO-LED PIXEL CIRCUIT AND DISPLAY DEVICE INCLUDING THE SAME

CROSS-REFERENCE TO RELATED APPLICATION

This application claims the priority of Korean Patent Application No. 10-2022-0175426 filed on Dec. 15, 2022, which is hereby incorporated by reference in its entirety.

BACKGROUND

Field of the Disclosure

The present disclosure relates to a display device, and more particularly, to a micro-LED pixel circuit and a display device including the same.

Description of the Background

A display device is widely used as a display screen for not only televisions or monitors but also notebook computers, tablet computers, smart phones, portable display devices, and portable information devices.

Recently, research and development on a micro-LED display device using a micro-sized micro-LED as a light-emitting element are in progress. Since the micro-LED display device has high image quality and high reliability, the micro-LED display device is in the limelight as a next-generation display device.

In the organic light-emitting device (OLED), a pulse amplitude modulation (PAM) scheme is used to adjust a voltage to adjust a gray-scale. However, in the micro-LED display device uses a pulse width modulation (PWM) scheme to control a time for which current flows through the micro-LED at the same voltage to adjust the gray-scale.

However, when operating the micro-LED at a low gray-scale, a time for which current flows through the micro-LED is short, and thus a time for which a voltage is charged to an anode electrode of the micro-LED is short, resulting in a low response speed and a low luminance output.

Therefore, a technique for improving the response speed of the micro-LED and minimizing the luminance decrease at the low gray-scale is required.

The above information disclosed in this Background section is only for enhancement of understanding of the background of the described technology and therefore it may contain information that does not form prior art that is already known to a person of ordinary skill in the art.

SUMMARY

Accordingly, the present disclosure is directed to a micro-LED pixel circuit and a display device including the same that substantially obviates one or more of problems due to limitations and disadvantages described above.

More specifically, the present disclosure is to provide a new scheme of biasing the voltage of the anode electrode of the micro-LED with a precharge voltage before emission in the PWM operation of the micro-LED, thereby improving the response speed of the micro-LED and minimizing the luminance decrease phenomenon at the low gray-scale.

The present disclosure is also to provide a novel micro-LED pixel circuit configured to bias the voltage of the anode electrode of the micro-LED with the precharge voltage before emission in the PWM operation of the micro-LED, thereby improving the response speed of the micro-LED and minimizing the luminance decrease phenomenon at the low gray-scale.

Further, the present disclosure is to provide a display device including a novel micro-LED pixel circuit.

The present disclosure is not limited to the above-mentioned features. Other advantages according to the present disclosure that are not mentioned may be understood based on following descriptions, and may be more clearly understood based on aspects according to the present disclosure. Further, it will be easily understood that the advantages according to the present disclosure may be realized using means shown in the claims or combinations thereof.

In an aspect of the present disclosure, a micro-LED pixel circuit includes a driving transistor configured to generate a current path; an emission transistor configured to be turned on in response to an emission signal to generate the current path together with the driving transistor; a micro-LED configured to emit light based on a magnitude of a current flowing in the current path; and a precharge transistor configured to bias an anode electrode of the micro-LED with a precharge voltage in response to a precharge signal, wherein the precharge signal is enabled before the emission signal is enabled.

In another an aspect of the present disclosure, a display device includes a display panel including a pixel circuit having a micro-LED; a voltage generator configured to generate a precharge voltage and to supply the generated precharge voltage to the display panel; and a driving circuit configured to apply an emission signal and a precharge signal to the pixel circuit to drive the display panel, wherein the driving circuit is configured to apply the precharge signal to the pixel circuit to bias an anode electrode of the micro-LED with the precharge voltage, wherein the precharge signal is enabled before the emission signal is enabled.

According to aspects, in the PWM operation of the micro-LED, biasing the anode electrode of the micro-LED with the precharge voltage before emission may allow the response speed of the micro-LED in a low gray-scale operation to be improved and the luminance decrease phenomenon in the low gray-scale operation to be minimized.

Further, despite the short emission time in the low gray-scale operation due to the characteristics of the micro-LED in which the gray-scale is controlled in the PWM scheme, stable current may be applied to the micro-LED Further, when the micro-LED operates at the low gray-scale, the response speed may be improved, and the luminance decrease phenomenon may be suppressed.

Further, the response speed may be improved in the high gray-scale operation of the micro-LED.

Effects of the present disclosure are not limited to the effects as mentioned above, and other effects not mentioned will be clearly understood by those skilled in the art from the descriptions below.

In addition to the effects as described above, specific effects of the present disclosure will be described together while describing specific details for carrying out the present disclosure.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIG. 4 is a graph showing that a gray-scale is adjusted based on a time for which a emission transistor in FIG. 3 is turned on.

DETAILED DESCRIPTION

Figure 1:
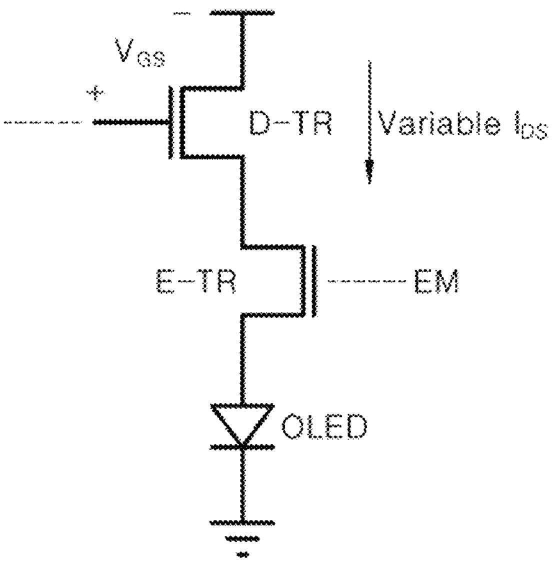
FIG. 1 is a pixel circuit diagram of an OLED display device according to an aspect of the present disclosure.

Advantages and features of the present disclosure, and a method of achieving the advantages and features will become apparent with reference to aspects described later in detail together with the accompanying drawings. However, the present disclosure is not limited to the aspects as disclosed under, but may be implemented in various different forms. Thus, these aspects are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various aspects are illustrated and described further below. It will be understood that the description herein is not intended to limit the claims to the specific aspects described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for describing aspects of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to describing particular aspects only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

When a certain aspect may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms “first”, “second”, “third”, and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various aspects of the present disclosure may be partially or entirely combined with each other, and may be technically associated with each other or operate with each other. The aspects may be implemented independently of each other and may be implemented together in an association relationship.

In interpreting a numerical value, the value is interpreted as including an error range unless there is no separate explicit description thereof.

It will be understood that when an element or layer is referred to as being “connected to”, or “coupled to” another element or layer, it may be directly on, connected to, or coupled to the other element or layer, or one or more intervening elements or layers may be present. In addition, it will also be understood that when an element or layer is referred to as being “between” two elements or layers, it may be the only element or layer between the two elements or layers, or one or more intervening elements or layers may also be present.

The features of the various aspects of the present disclosure may be partially or entirely combined with each other, and may be technically associated with each other or operate with each other. The aspects may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a micro-LED pixel circuit according to some aspects and a display device including the same will be described.

Prior to describing the aspects, the meaning of terms used herein is defined.

As used herein, an emission period may be defined as a period during which the micro-LED emits light.

As used herein, a precharge period may be defined as a period during which the anode electrode of the micro-LED is biased with a precharge voltage prior to the emission period.

As used herein, a porch period may be defined as a pre-preparation period before light-emission of the micro-LED. The porch period may include the precharge period or may be distinct from the precharge period.

As used herein, a luminance band may be defined as a target luminance of an image to be displayed on a display panel. In one example, a data voltage applied to a driving transistor and the precharge voltage for biasing the anode electrode of the micro-LED may be varied based on the target luminance.

Figure 2:
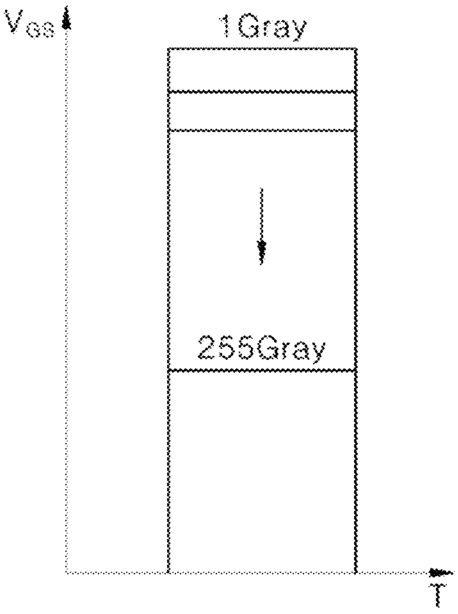
FIG. 2 is a graph showing that a gray-scale is adjusted based on a gate-source voltage of a driving transistor in FIG. 1.

FIG. 1 is a pixel circuit diagram of an OLED display device according to an aspect of the present disclosure. FIG. 2 is a graph showing that a gray-scale is adjusted based on a gate-source voltage of a driving transistor in FIG. 1.

Referring to FIG. 1 and FIG. 2, the OLED display device adjusts the gray-scale using the data voltage controlled in the pulse amplitude modulation (PAM) scheme based on the image data.

A driving transistor D-TR is turned on in response to a data voltage to generate a current path. The emission transistor E-TR is turned on in response to an emission signal to generate the current path together with the driving transistor D-TR.

A value of the current flowing in the OLED is adjusted based on a level of the data voltage controlled by the PAM scheme based on the image data.

Thus, as shown in FIG. 1 and FIG. 2, in the OLED display device, the gate-source voltage $V_{GS}$ of the driving transistor D-TR is varied according to the data voltage applied to a gate electrode of the driving transistor D-TR, and the gray-scale is adjusted based on the level of the variable gate-source voltage $V_{GS}$.

Figure 3:
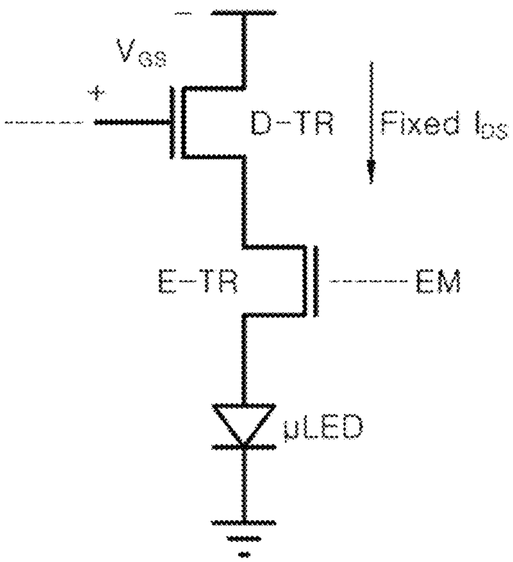
FIG. 3 is a pixel circuit diagram of a micro-LED display device according to an aspect of the present disclosure.
Figure 4:
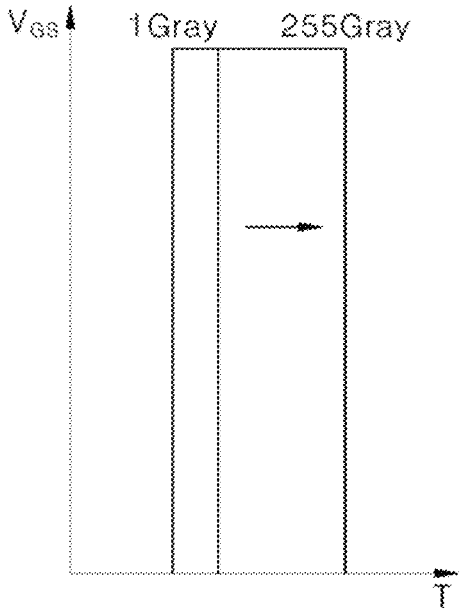

FIG. 3 is a pixel circuit diagram of a micro-LED display device according to an aspect of the present disclosure, and FIG. 4 is a graph showing that a gray-scale is adjusted based on a time for which an emission transistor shown in FIG. 3 is turned on.

Referring to FIG. 3 and FIG. 4, unlike the PAM scheme employed in the OLED display device, the micro-LED display device uses the pulse width modulation (PWM) scheme to control the time for which the current flows through the micro-LED at the same data voltage to adjust the gray-scale.

A driving transistor D-TR is turned on in response to the data voltage to generate a current path. An emission transistor E-TR is turned on in response to the emission signal to generate the current path together with the driving transistor D-TR.

The value of the current flowing through the micro-LED is adjusted based on a pulse width of the emission signal EM controlled in the PWM scheme based on the gray-scale.

Thus, as shown in FIG. 3 and FIG. 4, the micro-LED display device adjusts the time for which the current flows through the micro-LED based on the pulse width of the emission signal EM applied to a gate electrode of the emission transistor E-TR. Thus, the gray-scale may be adjusted based on the adjusted time.

However, when operating the micro-LED at a low gray-scale, a time for which current flows through the micro-LED is short, and thus a time for which a voltage is charged to an anode electrode of the micro-LED is short, resulting in low response speed and low luminance output.

As described above, in the micro-LED model, the gray-scale is adjusted in the PWM scheme different from the PAM scheme employed in the OLED. Thus, the emission time is short in the low gray-scale operation. Thus, a time for which the voltage is charged to the anode electrode of the micro-LED immediately after the emission is insufficient. Thus, compared to the existing model, the response speed is low, and luminance decrease phenomenon occurs.

Next, various aspects of the present disclosure in which the response speed of the micro-LED at the low gray-scale is improved, and the luminance decrease problem thereof at the low gray-scale is minimized are described.

In the micro-LED display device according to the present disclosure, the voltage of the anode electrode of the micro-LED is pre-charged before emission to supplement the low gray-scale operation characteristics of the micro-LED model such as a short emission time.

Further, the micro-LED display device according to the present disclosure may pre-apply an appropriate precharge voltage corresponding to a luminance band (DBV Band) such that the micro-LED immediately emits light upon reception of the emission signal, thereby improving the response speed and minimizing the luminance decrease problem.

In this regard, the luminance band may be defined as the target luminance of the displaying image on the display panel. In one example, the data voltage applied to the driving transistor and the precharge voltage for biasing the anode electrode of the micro-LED may be varied based on the target luminance.

The luminance band may be set per each of the R, G, and B pixels, and the precharge voltage may be varied based on the luminance band per each of the R, G, and B pixels.

Figure 5:
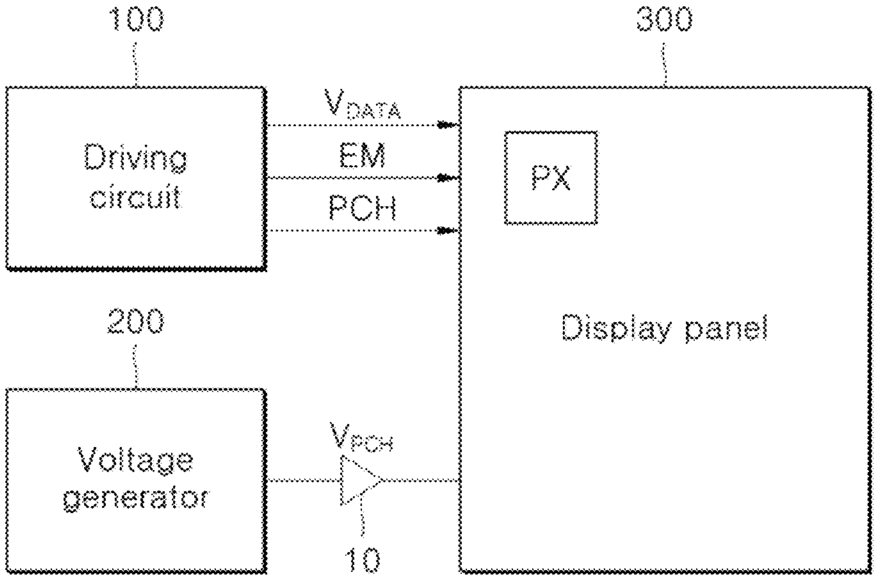
FIG. 5 is a block diagram of a micro-LED display device according to an aspect of the present disclosure.
Figure 6:
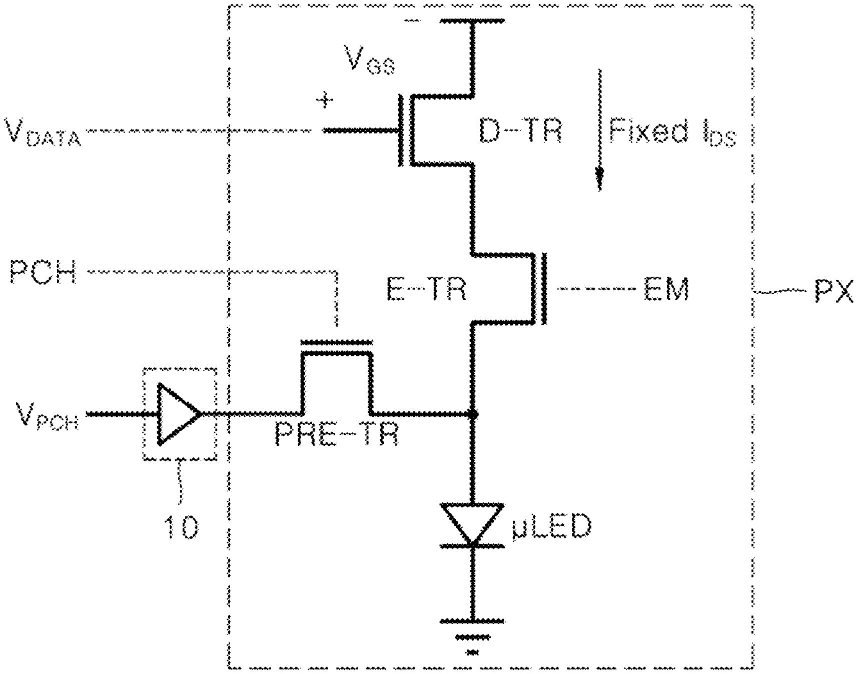
FIG. 6 is a micro-LED pixel circuit diagram according to an aspect of the present disclosure.

FIG. 5 is a block diagram of a micro-LED display device according to an aspect of the present disclosure, and FIG. 6 is a micro-LED pixel circuit diagram according to an aspect of the present disclosure.

Referring to FIG. 5 and FIG. 6, the micro-LED display device includes a display panel 300, a voltage generator 200, a driving circuit 100 and a buffer 10 provided between the voltage generator 200 and the display panel 300.

The display panel 300 includes a pixel circuit PX including the micro-LED uLED.

The pixel circuit PX includes the driving transistor D-TR, the emission transistor E-TR, the micro-LED uLED, and a precharge transistor PRE-TR.

The driving transistor D-TR generates a current path in response to the data voltage $V_{DATA}$. In one example, the data voltage $V_{DATA}$ is set to a value corresponding to the luminance band, and the driving transistor D-TR generates the current path in response to the data voltage $V_{DATA}$ corresponding to the luminance band.

In response to the emission signal EM, the emission transistor E-TR generates the current path together with the driving transistor D-TR. In one example, the emission signal EM has a pulse width modulated based on the gray-scale of the image to be displayed on the display panel 300. The emission transistor E-TR generates the current path in response to the pulse width of the emission signal EM that is modulated based on the gray-scale.

In one example, the pulse width of the emission signal EM in low gray-scale operation is modulated to be smaller than the pulse width of the emission signal EM in high gray-scale operation.

The micro-LED uLED emits light based on a magnitude of the current flowing in the current path. In one example, a magnitude of the current flowing through the micro-LED uLED may be fixed, and the time for which the current flows through the micro-LED uLED may be adjusted based on the pulse width of the emission signal EM.

In one example, the magnitude of the current flowing through the micro-LED uLED may be changed based on the luminance band. The magnitude of the current flowing through the micro-LED uLED in the same luminance band may be fixed.

The precharge transistor PRE-TR biases the anode electrode of the micro-LED uLED with the precharge voltage $V_{PCH}$ in response to a precharge signal PCH which is enabled before the emission signal EM is enabled. In one example, the precharge transistor PRE-TR biases the anode electrode of the micro-LED uLED with the precharge voltage $_{VPCH}$ that varies depending on the luminance band. In this regard, the luminance band may be set per each of the R, G, and B pixels, and the value of the precharge voltage $V_{PCH}$ may also be set based on the luminance band per each of the R, G, and B pixels. The luminance band per each of the R, G, and B pixels, and the precharge voltage $_{VPCH}$ corresponding to the luminance band per each of the R, G, and B pixels may be stored in a memory in a form of a lookup table. In one example, the memory may be located inside or outside a timing controller.

Alternatively, the precharge transistor PRE-TR may bias the anode electrode of the micro-LED uLED with the precharge voltage $V_{PCH}$ variable based on a threshold voltage of the micro-LED uLED.

In one example, the precharge voltage $V_{PCH}$ may be set to a level lower than the threshold voltage of the micro-LED uLED. The precharge transistor PRE-TR may bias the anode electrode of the micro-LED uLED with the precharge voltage $_{VPCH}$ set to the level lower than the threshold voltage of micro-LED uLED.

In one example, the precharge transistor PRE-TR may bias the anode electrode of the micro-LED uLED with the precharge voltage $V_{PCH}$ in low gray-scale operation in which a gray-scale of the image to be displayed is lower than a reference gray-scale.

In another example, the precharge transistor PRE-TR may bias the anode electrode of micro-LED uLED with the precharge voltage $V_{PCH}$ in each of low gray-scale operation and high gray-scale operation.

The voltage generator 200 generates the precharge voltage $V_{PCH}$ and supplies the same to the pixel circuit PX of the display panel 300. In one example, the precharge voltage $_{VPCH}$ may vary based on the luminance band of each of the R, G, and B pixels.

In one example, the voltage generator 200 may generate the precharge voltage $_{VPCH}$ varying based on the luminance band of each of the R, G, and B pixels, and may supply the precharge voltage $V_{PCH}$ corresponding to the luminance band of each of the R, G, and B pixels to the precharge transistor PRE-TR of the pixel circuit PX.

In one example, the voltage generator 200 may receive a control signal defining the value of the luminance band of each of the R, G, and B pixels from the timing controller, and may select the precharge voltage $_{VPCH}$ corresponding to the luminance band of each of the R, G, and B pixels based on the control signal and provide the selected precharge voltage $_{VPCH}$ to the display panel 300.

As described above, the buffer 10 may be provided between the voltage generator 200 and the display panel 300, so that the precharge voltage $_{VPCH}$ may be buffered through the buffer 10 and then may be provided to the display panel 300.

The driving circuit 100 may apply the emission signal EM and the precharge signal PCH to the pixel circuit PX to drive each of the plurality of pixel circuits PX of the display panel 300.

The driving circuit 100 may apply the precharge signal PCH enabled before enabling the emission signal EM to the pixel circuit PX to bias the anode electrode of the micro-LED uLED with the precharge voltage $_{VPCH}$.

Further, the driving circuit 100 provides the data voltage $V_{DATA}$ corresponding to the luminance band to the driving transistor D-TR of the pixel circuit PX.

Further, the driving circuit 100 modulates the pulse width of the emission signal EM based on the gray-scale of the image to be displayed on the display panel 300 and provides the emission signal EM having the modulated pulse width to the emission transistor E-TR of the pixel circuit PX.

In this way, the driving circuit 100 modulates the pulse width of the emission signal EM based on the gray-scale, selects the data voltage $_{VDATA}$ based on the luminance band, and provides the selected data voltage $V_{DATA}$ to the driving transistor D-TR.

In one example, the driving circuit 100 may receive a pulse width modulation control signal from the timing controller, and may modulate the pulse width of the emission signal EM to be a pulse width corresponding to a gray-scale according to the pulse width modulation control signal.

In one example, the driving circuit 100 may receive a data signal corresponding to the luminance band from the timing controller, select the data voltage $V_{DATA}$ in response to the data signal, and provide the selected data voltage $V_{DATA}$ to the display panel 300.

Unlike the OLED model that controls the gray-scale in the PAM scheme, in the micro-LED display device, the emission period in the low gray-scale operation may be short due to the characteristics of the micro model that controls the gray-scale in the PWM scheme, thereby improving the low gray-scale screen response speed and suppressing the phenomenon of the dark output rather than a desired luminance.

Further, in accordance with aspects, an appropriate precharge voltage corresponding to the luminance band is applied to the anode of the micro-LED before emission such that the micro-LED immediately emits light upon emission, improving the response speed and suppressing the luminance decrease phenomenon.

Figure 7:
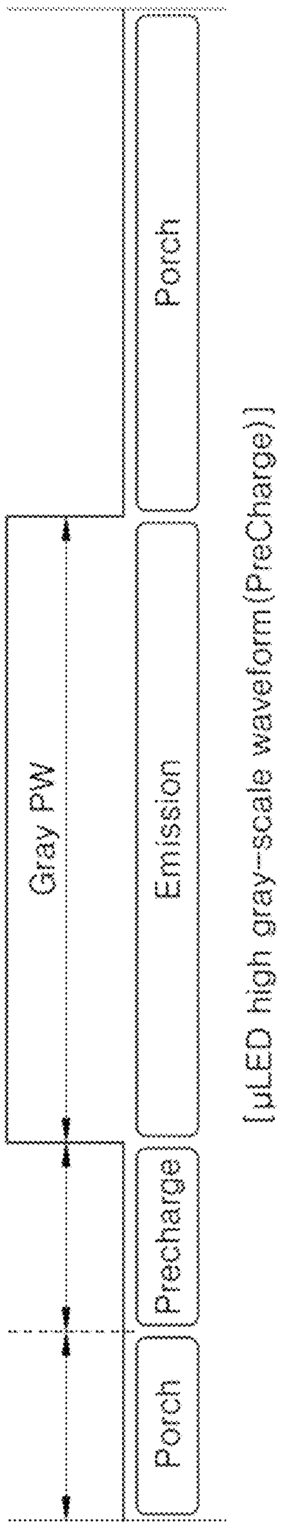
FIG. 7 is a high gray-scale waveform diagram of a micro-LED in a micro-LED display device according to an aspect of the present disclosure.
Figure 8:
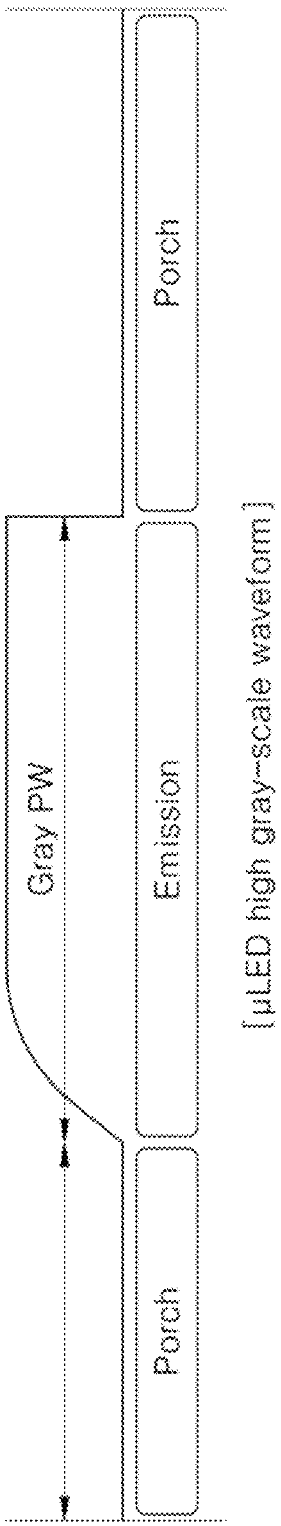
FIG. 8 is a high gray-scale waveform diagram of a micro-LED when precharge is not performed.

FIG. 7 is a high gray-scale waveform diagram of a micro-LED in a micro-LED display device according to an aspect of the present disclosure, and FIG. 8 is a high gray-scale waveform diagram of a micro-LED when the precharge is not performed.

Referring to FIG. 7, in the high gray-scale operation, the precharge voltage is applied to the anode of the micro-LED before the emission, such that the micro-LED emits light immediately upon emission. Thus, the response speed may be improved compared to that in FIG. 8 in which the precharge is not performed. or reference, in the high gray-scale operation rather than the low gray-scale operation, the luminance decrease may be small.

Figure 9:
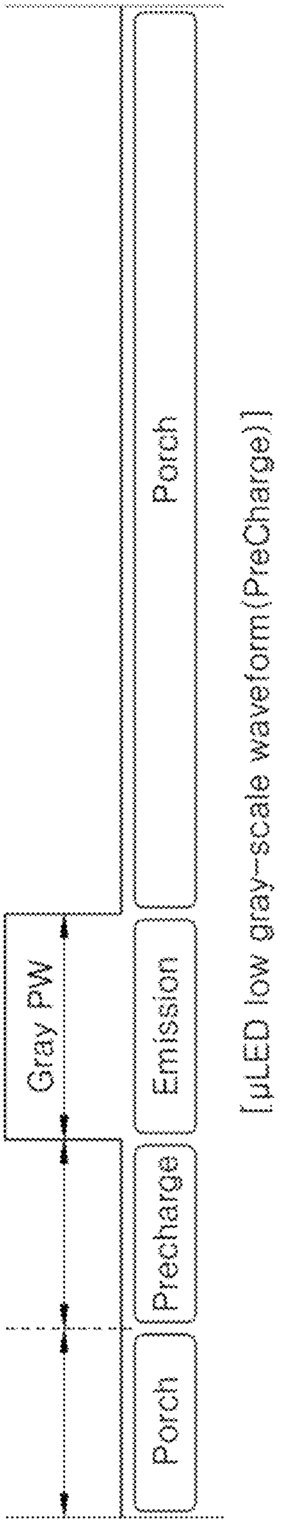
FIG. 9 is a low gray-scale waveform diagram of a micro-LED in a micro-LED display device according to an aspect of the present disclosure.
Figure 10:
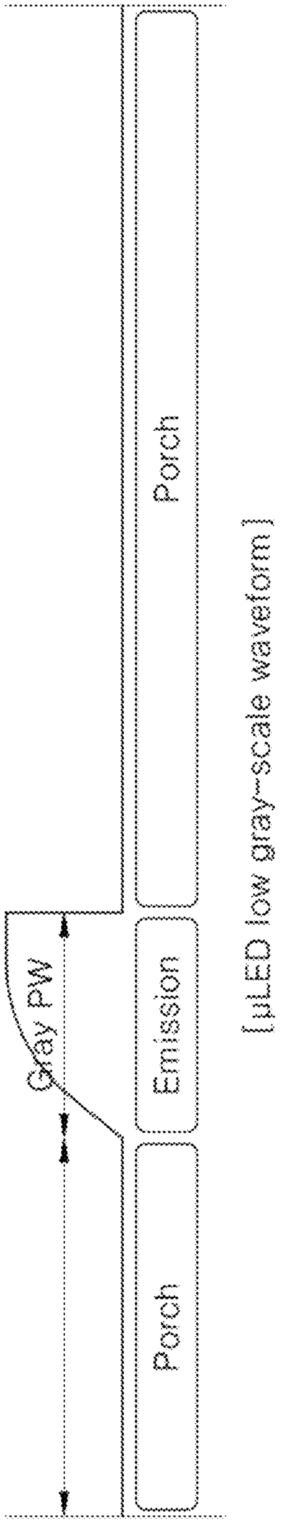
FIG. 10 is a low gray-scale waveform diagram of a micro-LED when precharge is not performed.

FIG. 9 is a low gray-scale waveform diagram of a micro-LED in a micro-LED display device according to an aspect. FIG. 10 is a low gray-scale waveform diagram of a micro-LED when the precharge is not performed.

Referring to FIG. 9, in the low gray-scale operation, the precharge voltage is applied to the anode of the micro-LED before emission, such that the micro-LED emits light immediately upon emission, thereby improving the response speed compared to that in FIG. 10 in which the precharge is not performed, and suppressing the luminance decrease phenomenon.

In one example, in accordance with aspects, the data voltage $V_{DATA}$ may be applied to the driving transistor D-TR prior to the application of the emission signal EM, or may be applied thereto at the same time when the emission signal EM is applied to the emission transistor E-TR.

The precharge signal PCH may be applied to the precharge transistor PRE-TR prior to the application of the emission signal EM, and may be disabled when the emission signal EM is applied to the emission transistor E-TR.

In various aspects of the present disclosure, each of the driving transistor D-TR, the emission transistor E-TR, and the precharge transistor PRE-TR is shown as being embodied as an NMOS transistor. However, the present disclosure is not limited thereto. At least one of the driving transistor D-TR, the emission transistor E-TR, and the precharge transistor PRE-TR may be embodied as an NMOS transistor or a PMOS transistor.

A micro-LED pixel circuit PX according to an aspect includes a driving transistor D-TR configured to generate a current path; an emission transistor E-TR configured to be turned on in response to an emission signal EM to generate the current path together with the driving transistor D-TR; a micro-LED uLED configured to emit light based on a magnitude of a current flowing in the current path; and a precharge transistor PRE-TR configured to bias an anode electrode of the micro-LED uLED with a precharge voltage $V_{PCH}$ in response to a precharge signal PCH, wherein the precharge signal PCH is enabled before the emission signal EM is enabled.

In some implementations of the micro-LED pixel circuit PX, the driving transistor D-TR is configured to be turned on in response to a data voltage $V_{DATA}$ to generate the current path, wherein the data voltage $V_{DATA}$ is set to a value corresponding to a luminance band of each of R, G, and B pixels.

In some implementations of the micro-LED pixel circuit PX, the precharge transistor PRE-TR is configured to bias the anode electrode with the precharge voltage $V_{PCH}$ varying based on the luminance band of each of the R, G, and B pixels.

In some implementations of the micro-LED pixel circuit PX, the emission signal EM applied to the emission transistor E-TR to generate the current path has a pulse width modulated based on a gray-scale of an image to be displayed.

In some implementations of the micro-LED pixel circuit PX, the precharge transistor PRE-TR is configured to bias the anode electrode with the precharge voltage $V_{PCH}$ varying based on a threshold voltage of the micro-LED uLED.

In some implementations of the micro-LED pixel circuit PX, the precharge transistor PRE-TR is configured to bias the anode electrode with the precharge voltage $V_{PCH}$ set to a level lower than a threshold voltage of the micro-LED uLED.

In some implementations of the micro-LED pixel circuit PX, the precharge transistor PRE-TR is configured to bias the anode electrode of the micro-LED uLED with the precharge voltage $V_{PCH}$ in a low gray-scale operation in which a gray-scale of an image to be displayed is lower than a reference gray-scale.

A display device according to one aspect includes a display panel 300 including a pixel circuit PX having a micro-LED uLED; a voltage generator 200 configured to generate a precharge voltage $_{VPCH}$ and to supply the generated precharge voltage $V_{PCH}$ to the display panel 300; and a driving circuit 100 configured to apply an emission signal EM and a precharge signal PCH to the pixel circuit PX to drive the display panel 300, wherein the driving circuit 100 is configured to apply the precharge signal PCH to the pixel circuit PX to bias an anode electrode of the micro-LED uLED with the precharge voltage $_{VPCH}$, wherein the precharge signal PCH is enabled before the emission signal EM is enabled.

In some implementations of the display device, the driving circuit 100 is configured to provide a data voltage $V_{DATA}$ to a driving transistor D-TR of the pixel circuit PX, wherein the data voltage $V_{DATA}$ varies based on a luminance band of each of the R, G, and B pixels.

In some implementations of the display device, the voltage generator 200 is configured to provide the precharge voltage $_{VPCH}$ to a precharge transistor PRE-TR of the pixel circuit PX, wherein the precharge voltage $V_{PCH}$ varies based on a luminance band of each of R, G, and B pixels.

In some implementations of the display device, the driving circuit 100 is configured: to modulate a pulse width of the emission signal EM based on a gray-scale of an image to be displayed on the display panel 300; and to provide the emission signal EM having the modulated pulse width to an emission transistor E-TR of the pixel circuit PX.

In some implementations of the display device, the display device further comprises a buffer 10 configured to buffer the precharge voltage $V_{PCH}$ output from the voltage generator 200 and to provide the buffered precharge voltage $V_{PCH}$ to the display panel 300.

In some implementations of the display device, the pixel circuit PX includes: a driving transistor D-TR configured to generate a current path; an emission transistor E-TR configured to be turned on in response to the emission signal EM to generate the current path together with the driving transistor D-TR; the micro-LED uLED configured to emit light based on a magnitude of a current flowing in the current path; and a precharge transistor PRE-TR configured to bias an anode electrode of the micro-LED uLED with the precharge voltage $V_{PCH}$ in response to the precharge signal PCH, wherein the precharge signal PCH is enabled before the emission signal EM is enabled.

In some implementations of the display device, the driving transistor D-TR is configured to be turned on in response to a data voltage $V_{DATA}$ to generate the current path, wherein the data voltage $V_{DATA}$ varies based on a luminance band of each of R, G, and B pixels.

In some implementations of the display device, the precharge transistor PRE-TR is configured to bias the anode electrode with the precharge voltage $V_{PCH}$ varying based on the luminance band of each of the R, G, and B pixels.

In some implementations of the display device, the emission signal EM applied to the emission transistor E-TR to generate the current path has a pulse width modulated based on a gray-scale of an image to be displayed.

In some implementations of the display device, the precharge transistor PRE-TR is configured to bias the anode electrode with the precharge voltage $V_{PCH}$ varying based on a threshold voltage of the micro-LED uLED.

In some implementations of the display device, the precharge transistor PRE-TR is configured to bias the anode electrode with the precharge voltage $V_{PCH}$ set to a level lower than a threshold voltage of the micro-LED uLED.

In some implementations of the display device, the precharge transistor PRE-TR is configured to bias the anode electrode of the micro-LED uLED with the precharge voltage $V_{PCH}$ in a low gray-scale operation in which a gray-scale of an image to be displayed is lower than a reference gray-scale.

In some implementations of the display device, the driving circuit 100 is configured to modulate a pulse width of the emission signal EM based on a gray-scale, to select a data voltage $V_{DATA}$ based on a luminance band, and to apply the selected data voltage $V_{DATA}$ to the driving transistor D-TR.

According to various aspects of the present disclosure, in the PWM operation of the micro-LED, biasing the anode electrode of the micro-LED with the precharge voltage before emission improves the response speed of the micro-LED in a low gray-scale operation and minimizes the luminance decrease phenomenon in the low gray-scale operation.

Further, despite the short emission time in the low gray-scale operation due to the characteristics of the micro-LED in which the gray-scale is controlled in the PWM scheme, stable current may be applied to the micro-LED Further, when the micro-LED operates at the low gray-scale, the response speed is improved, and the luminance decrease phenomenon is suppressed.

Further, the response speed improves in the high gray-scale operation of the micro-LED.

It will be apparent to those skilled in the art that various modifications and variations can be made in the micro-LED pixel circuit and the display device including the same of the present disclosure without departing from the spirit or scope of the aspects. Thus, it is intended that the present disclosure covers the modifications and variations of the aspects provided they come within the scope of the appended claims and their equivalents.

What is claimed is:

1. A micro-LED pixel circuit comprising:

a driving transistor configured to generate a current path in response to a data voltage;

an emission transistor configured to be turned on in response to an emission signal and generate the current path together with the driving transistor;

a micro-LED configured to emit light based on a magnitude of a current flowing in the current path; and a precharge transistor configured to bias an anode electrode of the micro-LED with a precharge voltage corresponding to a luminance band in response to a precharge signal, wherein, during a precharge period preceding an emission period, the precharge signal is enabled prior to the emission signal to precharge the anode electrode with the precharge voltage, based on an image to be displayed corresponding to a low gray-scale, and wherein, during the emission period, a same data voltage is applied to each pixel such that the magnitude of the current flowing through the micro-LED is fixed, and a pulse width of the emission signal is modulated according to a gray-scale of an image to be displayed, thereby controlling a duration of the current flowing through the micro-LED and adjusting a gray-scale value of each pixel.

2. The micro-LED pixel circuit of claim 1, wherein the data voltage is set to a value corresponding to a luminance band of each of R, G, and B pixels.

3. The micro-LED pixel circuit of claim 2, wherein the precharge transistor is configured to bias the anode electrode with the precharge voltage varying based on the luminance band of each of the R, G, and B pixels.

4. The micro-LED pixel circuit of claim 1, wherein the emission transistor is configured to generate the current path in response to the emission signal having the pulse width modulated based on the gray-scale of the displaying image.

5. The micro-LED pixel circuit of claim 1, wherein the precharge transistor is configured to bias the anode electrode with the precharge voltage varying based on a threshold voltage of the micro-LED.

6. The micro-LED pixel circuit of claim 5, wherein the precharge transistor is configured to bias the anode electrode with the precharge voltage set to a level lower than the threshold voltage of the micro-LED.

7. The micro-LED pixel circuit of claim 1, wherein the precharge transistor is configured to bias the anode electrode of the micro-LED with the precharge voltage in a low gray-scale operation in which the gray-scale of the displaying image is lower than a reference gray-scale.

8. A display device comprising:

a display panel including a pixel circuit having a micro-LED;

a voltage generator configured to generate a precharge voltage corresponding to a luminance band and supply the generated precharge voltage to the display panel; and a driving circuit configured to apply an emission signal, a precharge signal and a data voltage to the pixel circuit to drive the display panel and apply the precharge signal to the pixel circuit to bias an anode electrode of the micro-LED with the precharge voltage, wherein, during a precharge period preceding an emission period, the precharge signal is enabled prior to the emission signal to precharge the anode electrode with the precharge voltage, based on an image to be displayed corresponding to a low gray-scale, and wherein, during the emission period, a same data voltage is applied to each pixel such that the magnitude of the current flowing through the micro-LED is fixed, and a pulse width of the emission signal is modulated according to a gray-scale of an image to be displayed, thereby controlling a duration of the current flowing through the micro-LED and adjusting a gray-scale value of each pixel.

9. The display device of claim 8, wherein the driving circuit is configured to provide a data voltage to a driving transistor of the pixel circuit, and wherein the data voltage varies based on a luminance band of each of the R, G, and B pixels.

10. The display device of claim 9, wherein the voltage generator is configured to provide the precharge voltage to a precharge transistor of the pixel circuit, and wherein the precharge voltage varies based on the luminance band of each of R, G, and B pixels.

11. The display device of claim 8, wherein the driving circuit is configured:

to modulate the pulse width of the emission signal based on the gray-scale of the displaying image on the display panel; and to provide the emission signal having the modulated pulse width to an emission transistor of the pixel circuit.

12. The display device of claim 8, further comprising a buffer buffering the precharge voltage output from the voltage generator and providing the buffered precharge voltage to the display panel.

13. The display device of claim 8, wherein the pixel circuit includes:

a driving transistor configured to generate a current path in response to the data voltage;

an emission transistor configured to be turned on in response to the emission signal to generate the current path together with the driving transistor; and a precharge transistor configured to bias an anode electrode of the micro-LED with the precharge voltage in response to the precharge signal, wherein the micro-LED configured to emit light based on a magnitude of a current flowing in the current path.

14. The display device of claim 13, wherein the driving transistor is configured to be turned on in response to the data voltage to generate the current path, and wherein the data voltage varies based on a luminance band of each of R, G, and B pixels.

15. The display device of claim 14, wherein the precharge transistor is configured to bias the anode electrode with the precharge voltage varying based on the luminance band of each of the R, G, and B pixels.

16. The display device of claim 14, wherein the driving circuit is configured to modulate the pulse width of the emission signal based on the gray-scale, select the data voltage based on the luminance band, and apply the selected data voltage to the driving transistor.

17. The display device of claim 13, wherein the emission transistor is configured to generate the current path in response to the emission signal having the pulse width modulated based on the gray-scale of the displaying image.

18. The display device of claim 13, wherein the precharge transistor is configured to bias the anode electrode with the precharge voltage varying based on a threshold voltage of the micro-LED.

19. The display device of claim 18, wherein the precharge transistor is configured to bias the anode electrode with the precharge voltage set to a level lower than the threshold voltage of the micro-LED.

20. The display device of claim 13, wherein the precharge transistor is configured to bias the anode electrode of the micro-LED with the precharge voltage in a low gray-scale operation in which the gray-scale of the displaying image is lower than a reference gray-scale.

21. A display device comprising:

a driving transistor configured to generate a current path in response to a data voltage;

a micro-LED configured to emit light based on a magnitude of a current flowing in the current path;

an emission transistor configured to be turned on in response to an emission signal and generate the current path with the driving transistor;

a voltage generator configured to generate a precharge voltage corresponding to a luminance band and supply the generated precharge voltage to a display panel;

a precharge transistor configured to bias an anode electrode of the micro-LED with the precharge voltage in response to a precharge signal; and a driving circuit configured to modulate a pulse width of the emission signal according to a gray-scale of an image to be displayed, select the data voltage based on the luminance band, and apply the selected data voltage to the driving transistor, wherein, during a precharge period preceding an emission period, the precharge signal is enabled prior to the emission signal to precharge the anode electrode with the precharge voltage, based on an image to be displayed corresponding to a low gray-scale, and wherein, during the emission period, a same data voltage is applied to each pixel such that the magnitude of the current flowing through the micro-LED is fixed, and a pulse width of the emission signal is modulated according to a gray-scale of an image to be displayed, thereby controlling a duration of the current flowing through the micro-LED and adjusting a gray-scale value of each pixel.

22. The display device of claim 21, wherein the anode electrode of the micro-LED is biased with the precharge voltage, in operation with the gray-scale lower than a reference gray-scale.

* * * * *